(12) United States Patent
Zhang et al.

(10) Patent No.: US 11,789,557 B2
(45) Date of Patent: Oct. 17, 2023

(54) TOUCHPAD AND ELECTRONIC DEVICE

(71) Applicant: Shenzhen Goodix Technology Co., Ltd., Guangdong (CN)

(72) Inventors: Rong Zhang, Guangdong (CN); Zhongbo Luo, Guangdong (CN); Xiaoxia Yan, Guangdong (CN); Xu Lu, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/483,735

(22) Filed: Sep. 23, 2021

(65) Prior Publication Data

US 2022/0214790 A1    Jul. 7, 2022

Related U.S. Application Data

(63) Continuation of application No. PCT/CN2021/076103, filed on Feb. 8, 2021.

(30) Foreign Application Priority Data

Jan. 5, 2021    (WO) ............... PCT/CN2021/070375

(51) Int. Cl.
*G06F 3/041*    (2006.01)
*G06F 3/01*    (2006.01)

(52) U.S. Cl.
CPC .......... *G06F 3/04144* (2019.05); *G06F 3/016* (2013.01)

(58) Field of Classification Search
CPC .. G06F 3/04144; G06F 3/016; G06F 3/04142; G06F 2203/04105; G06F 3/0414–04146; G06F 1/16; G06F 3/03547; G06F 3/0416; G06F 3/044; B06B 1/0603
See application file for complete search history.

(56) References Cited

U.S. PATENT DOCUMENTS 11,061,448 B1 *  7/2021  Huang ................... G06F 1/169
2008/0122315 A1   5/2008  Maruyama et al.
(Continued)

FOREIGN PATENT DOCUMENTS

CN    102483665 A    5/2012
CN    105373228 A    3/2016
(Continued)

OTHER PUBLICATIONS

Shenzhen Goodix Technology Co., Ltd., International Search Report, PCT/CN2021/076103, dated Oct. 11, 2021, 4 pgs.
(Continued)

*Primary Examiner* — Temesghen Ghebretinsae
*Assistant Examiner* — Ivelisse Martinez Quiles
(74) *Attorney, Agent, or Firm* — USCH Law, PC

(57) ABSTRACT

A touchpad and an electronic device are disclosed. The touchpad includes a touch panel; a plurality of pressure sensors fixed to an elastic bracket and configured to detect a pressure applied on the touch panel; a piezoelectric ceramic assembly including a piezoelectric ceramic plate configured to provide a vibration feedback to a user, where the piezoelectric ceramic assembly is fixed below the touch panel in a suspended manner and spaced from the elastic bracket.

17 Claims, 9 Drawing Sheets

(56) References Cited

U.S. PATENT DOCUMENTS

| | | | | |
|---|---|---|---|---|
| 2012/0104901 A1* | 5/2012 | Jiang | ................... | G06F 3/016 |
| | | | | 310/330 |
| 2012/0242593 A1* | 9/2012 | Kim | ................... | G06F 3/016 |
| | | | | 345/173 |
| 2014/0306914 A1 | 10/2014 | Kagayama | | |
| 2015/0198977 A1 | 7/2015 | Takizawa et al. | | |
| 2018/0029078 A1* | 2/2018 | Park | ................... | H01L 41/0471 |
| 2021/0216154 A1* | 7/2021 | Sa | ................... | G06F 3/041 |

FOREIGN PATENT DOCUMENTS

| | | |
|---|---|---|
| CN | 107683447 A | 2/2018 |
| CN | 109791742 A | 5/2019 |
| CN | 110178380 A | 8/2019 |
| CN | 110837313 A | 2/2020 |
| CN | 111665973 A | 9/2020 |
| CN | 111857439 A | 10/2020 |
| CN | 214225888 U | 9/2021 |

OTHER PUBLICATIONS

Shenzhen Goodix Technology Co., Ltd., International Search Report, PCT/CN2021/070375, dated Oct. 9, 2021, 4 pgs.

* cited by examiner

TOUCHPAD AND ELECTRONIC DEVICE

CROSS REFERENCE TO RELATED APPLICATIONS

The present application is a continuation of PCT Application No. PCT/CN2021/076103, filed Feb. 8, 2021 which claims priorities to PCT Application No. PCT/CN2021/070375, filed Jan. 5, 2021, and each of which is incorporated by reference herein in its entirety.

TECHNICAL FIELD

Embodiments of the present disclosure relate to the field of electronic technology, and in particular to a touchpad and an electronic device.

BACKGROUND

Touchpad is an input device applied to an electronic device for controlling a screen cursor. The touchpad detects a small capacitance change when operations are applied by a user's finger in a panel area, and obtains touch information such as high-resolution finger coordinates, so as to accurately control the screen cursor to move and/or click. Conventionally, the touchpad has its back equipped with a single button, behavior of which is detected to achieve functions as left and right clicks of a typical mouse.

In order to improve convenience for operation of the touchpad, a pressure-detection based touchpad gradually becomes a new trend, which eliminates physical buttons of the conventional touchpad and has functions such as pressure sensing and vibration feedback.

At present, pressure-detection based touchpad of piezoelectric ceramic type has defects such as low vibration, poor user experience, low accuracy of pressure detection and failure to detect continuous pressure.

SUMMARY

In view of the above, the present disclosure provides a touchpad and an electronic device, which improve pressure detection accuracy of the touchpad, are capable of detecting a continuous pressure, have a good vibration feedback effect, and thus improve user experience.

Embodiments of the present disclosure provide a touchpad, including a touch panel, a plurality of pressure sensors and a piezoelectric ceramic assembly. The plurality of pressure sensors are fixed to an elastic bracket and configured to detect a pressure applied on the touch panel. The piezoelectric ceramic assembly includes a piezoelectric ceramic plate configured to provide a vibration feedback to a user, and the piezoelectric ceramic assembly is fixed below the touch panel in a suspended manner and spaced from the elastic bracket.

The piezoelectric ceramic plate is employed to provide the vibration feedback, meanwhile the pressure sensor is employed to detect the pressure, thereby improving accuracy of pressure detection, and making it possible to detect a continuous pressure. In addition, the piezoelectric ceramic assembly is fixed below the touch panel in a suspended manner and thus spaced from the elastic bracket for supporting the pressure sensor, so that the vibration of the piezoelectric ceramic plate shall not affect the pressure detection of the pressure sensor, the vibration of the piezoelectric ceramic plate is strongly felt, and thus a good user experience is offered. In addition, a piezoelectric ceramic plate serves as a vibration source, such that the touchpad has a lighter and thinner structure and generates a vibration to be clearly and sufficiently felt.

In an embodiment, the touchpad further includes a fixing structure for suspending and fixing the piezoelectric ceramic assembly below the touch panel.

The piezoelectric ceramic plate is fixed below the touch panel in a suspended manner with a fixing structure, which is low cost and easy to install.

In an embodiment, the piezoelectric ceramic plate includes a piezoelectric ceramic sheet, a metal substrate and an electrode; and both ends of the metal substrate protrude from the piezoelectric ceramic and the electrode, and fixed below the touch panel by the fixing structure.

Both ends of the metal substrate protrude from the piezoelectric ceramic and the electrodes and fixed below the touch panel by the fixing structure, which enables the piezoelectric ceramic assembly to be fixed below the touch panel in a suspended manner.

In an embodiment, the piezoelectric ceramic assembly further includes a weighting block fixed to a bottom of the piezoelectric ceramic plate and configured to strengthen a vibration of the piezoelectric ceramic plate.

The weighting block may increase the counter acting force between the piezoelectric ceramic plate and the circuit board or reinforcing plate below the touch panel, thereby strengthening the vibration of the piezoelectric ceramic plate and reducing the vibration sound.

In an embodiment, the weighting block is a cuboid block defining a second groove in which the piezoelectric ceramic plate is disposed.

A thickness of the touch panel can be further reduced by disposing the piezoelectric ceramic plate in the groove defined by the weighting block.

In an embodiment, the weighting block is fixed at or near a center of gravity of the piezoelectric ceramic plate.

Since the weighting block is fixed at the center of gravity of the piezoelectric ceramic plate, the piezoelectric ceramic plate is subjected to a force evenly distributed. On the one hand, the pressure applied on one end of the piezoelectric ceramic plate is not larger than that on the other end, which prevents the fixing structure from easily falling off, and on the other hand, the vibration feedback effect is better.

In an embodiment, the weighting block is a copper block, a lead block or a steel block.

The weighting block with a large density is selected, which has a small volume and a good weighting effect.

In an embodiment, a weight of the weighting block is a range from 2.4 g to 2.6 g.

The weighting block of an appropriate weight is selected to enhance the vibration feedback effect.

In an embodiment, a distance between the fixing structure and the piezoelectric ceramic sheet is greater than or equal to 0.1 mm.

A gap space the fixing structure from the piezoelectric ceramic sheet, so that the fixing structure does not affect the vibration of the piezoelectric ceramic plate.

In an embodiment, the piezoelectric ceramic plate includes a piezoelectric ceramic sheet, a metal substrate and an electrode. One end of the piezoelectric ceramic sheet is fixed below the touch panel by the fixing structure.

In an embodiment, one end of the metal substrate protrudes from the piezoelectric ceramic and the electrode, and one end of the metal substrate and the end of the piezoelectric ceramic are both fixed below the touch panel by the fixing structure.

The end of the metal substrate protrudes from the piezoelectric ceramic and the electrode and is fixed below the touch panel by the fixing structure, which enables the piezoelectric ceramic assembly to be fixed under the touch panel in a suspended manner.

In an embodiment, the fixing structure includes a glue, a double-sided adhesive tape, a screw, a buckle or a solder.

Optionally, the piezoelectric ceramic assembly may be fixed to the lower surface of the circuit board by gluing, adhering, welding, screwing, snapping, or the like. The welding may be soldering or laser spot welding.

In an embodiment, a thickness of the fixing structure is in a range from 0.4 mm to 0.6 mm.

The fixing structure has an appropriate thickness, which, on the one hand, is thick enough to keep the piezoelectric ceramic plate out of contact with the touch panel during vibrating, and on the other hand, is thin enough to not increase the thickness of the touch panel.

In an embodiment, a length of the piezoelectric ceramic plate in in a range from 49 mm to 51 mm, and a width of the piezoelectric ceramic plate in in a range from 5 mm to 7 mm.

In an embodiment, the touchpad includes one piezoelectric ceramic plate arranged at a center of the touch panel and mounted in a direction parallel to a long side or a short side of the touch panel.

In an embodiment, the touchpad includes a plurality of piezoelectric ceramic plates. The plurality of piezoelectric ceramic plates disposed parallelly side by side. Alternatively, some of the plurality of piezoelectric ceramic plates are arranged side by side parallel to a long side of the touch panel, and other some of the plurality of piezoelectric ceramic plates are arranged side by side parallel to a short side of the touch panel.

The plurality of piezoelectric ceramic plates are provided to strengthen the vibration. The piezoelectric ceramic plates may be parallel or inclined to any side of the touch panel, resulting in a flexible installation. By evenly and symmetrically distributing the plurality of piezoelectric ceramic plates on the touch panel, thereby increasing consistency of vibration strength at different positions of the touch panel.

In an embodiment, the touch pad includes four pressure sensors. Projections of the four pressure sensors on the touch panel are located at four corners of the touch panel, respectively. Alternatively, projections of the four pressure sensors on the touch panel are located at centers of four sides in the touch panel, respectively.

In an embodiment, the plurality of pressure sensors are fixed beside the touch panel, and projections of the plurality of pressure sensors on a plane where the touch panel is located is outside a region of the touch panel.

The pressure sensors are fixed beside of the touchpad, so that the thickness of the touch panel can be reduced.

In an embodiment, the elastic bracket includes two short shafts fixed to an edge region below the touch panel and one long shaft, and the plurality of pressure sensors are disposed on the short shafts.

In an embodiment, the long shaft extends along a side of the touch panel such that the plurality of pressure sensors are located on the plane where the touch panel is located.

In an embodiment, the touchpad includes two elastic brackets disposed opposite to each other, each of which is provided with two pressure sensors.

In an embodiment, the elastic bracket defines a first groove, a top portion of each of two side walls of the first groove is fixed below the touch panel, and the plurality of pressure sensors are fixed to a bottom wall of the first groove.

In an embodiment, the top portion of each of the two side walls extends outward to form a step, and an upper surface of the step is fixed below the touch panel.

The elastic bracket adopts a groove structure, is connected to the touch panel with the surface of the outwardly extending step, thereby strengthening stability of the structure.

In an embodiment, a stacked structure below the touch panel defines another groove in which top portions of the two side walls of the first groove are fixed.

By fixing the elastic bracket in the groove defined by the stacked structure below the touch panel, it is advantageous to reduce a thickness of the touch panel.

In an embodiment, the touch pad further includes a reinforcing plate fixed to both ends of a lower surface of a circuit board and configured to increase rigidity of the touch panel.

The reinforcing plate serves to increase the rigidity of the touch panel, thereby reducing the deformation and collapse of the touch panel caused when being pressed by the user.

Embodiments of the present disclosure provide an electronic device including a touchpad in any one of the embodiments of the first aspect.

DETAILED DESCRIPTION

Technical solutions according to the embodiments of the present disclosure will be described below with reference to the accompanying drawings.

Touchpad is an input device applied to an electronic device for controlling a screen cursor. The touchpad detects a small capacitance change when operations are applied by a user's finger in a panel area, and obtains touch information such as high-resolution finger coordinates, so as to accurately control the screen cursor to move and/or click. Conventionally, the touchpad has its back equipped with a single button, behavior of which is detected to achieve functions as left and right clicks of a typical mouse.

In order to improve convenience for operation of the touchpad, a pressure-detection based touchpad gradually becomes a new trend, which eliminates physical buttons used in the conventional touchpad and has functions such as pressure sensing and vibration feedback.

A typical pressure-detection based touchpad employs a detection-control scheme with a linear motor, which mainly has defects as follows.

1. The resulting structure has a large thickness and thus occupies an internal space for a battery of an electronic device, which causes the touchpad inadaptable to a thin and light electronic device.

2. The vibration of the linear motor is delayed and unclearly to be felt.

3. The power consumption of the linear motor is high.

Another typical pressure-detection based touchpad employs a detection-control scheme with piezoelectric ceramic, which becomes more and more popular because of its advantages of thinness and lightness. Embodiments of the present disclosure are implemented based on the detection-control scheme with piezoelectric ceramic.

A typical pressure-detection based touchpad based on a detection-control scheme with piezoelectric ceramic will be described below with reference to FIG. 1.

Figure 1:
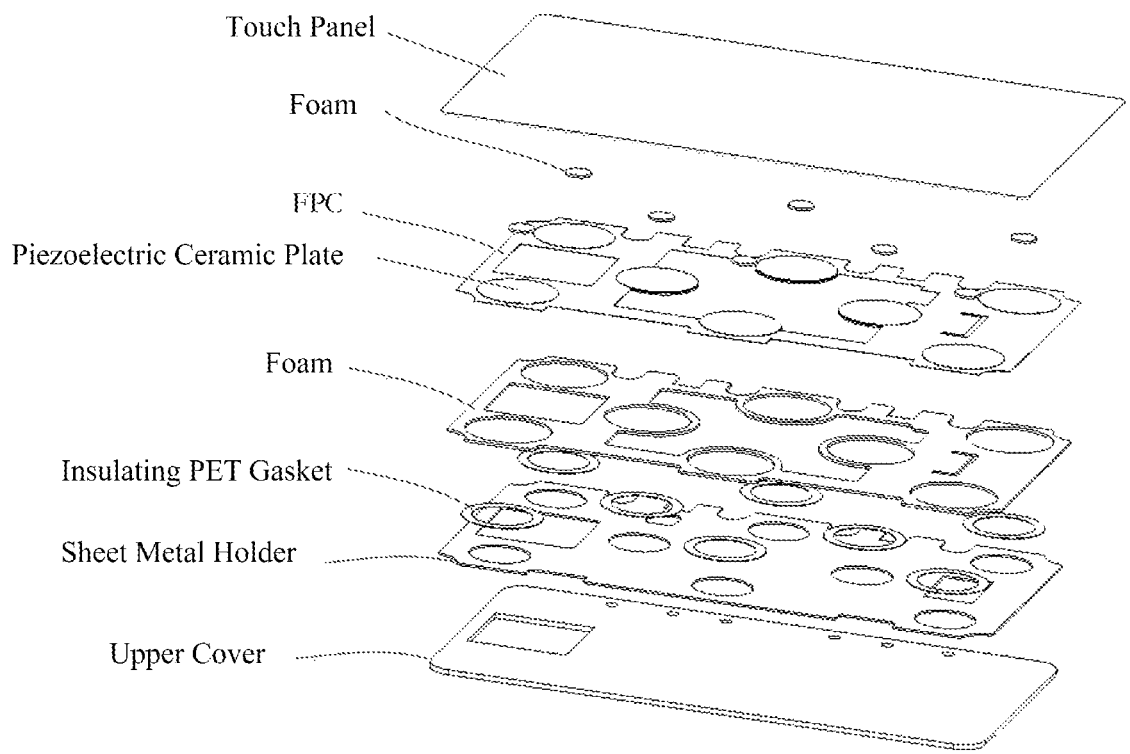
FIG. 1 is a schematic exploded view of a typical pressure-detection based touchpad.

FIG. 1 is a schematic exploded view of a typical pressure-detection based touchpad. As shown in FIG. 1, it includes, from top to bottom, a touch panel, a foam, a piezoelectric ceramic plate, a flexible printed circuit (FPC), a foam, an insulating polyethylene terephthalate (PET) gasket, a sheet metal holder and an upper cover. The touch panel may include a cover plate and a touch printed circuit board (PCB). Since the piezoelectric ceramic plate can also perform pressure detection, the foam may also be referred to as a sensor foam.

Specifically, when a user presses the touch panel with a finger, the foam below the touch panel transmits a pressure to the piezoelectric ceramic plate. The piezoelectric ceramic plate generates an electrical signal under a direct piezoelectric effect. The control chip generates a driving signal after receiving the electrical signal, and drives the piezoelectric ceramic plate to generate vibration which is then transmitted to the touch panel through the foam. The foams above and below the piezoelectric ceramic plate are mainly serves as a cushion against the pressure and meanwhile absorbs a sound caused by the vibration. The FPC is used to connect a plurality of piezoelectric ceramic plates and transmit the electrical signal to the control chip. The sheet metal holder and the cover serve as support.

Since the piezoelectric ceramic plate generate the electric signal for pressure detection by an electric potential difference generated through expansion and contraction between foams, accuracy of the pressure detection is low, and it is impossible to detect a continuous pressure. In addition, the vibration of a single piezoelectric ceramic plate is weakly felt, resulting in poor user experience. In other to make the vibration to be strongly felt, a plurality of piezoelectric ceramic plates are required and should be driven separately, resulting in high cost.

In view of the above, the embodiments of the present disclosure provide a touchpad based on the detection-control scheme with piezoelectric ceramic, which can solve the above various problems.

It should be appreciated that the technical solutions according to the embodiment of the present disclosure may be applied to various electronic devices.

For example, the electronic devices may be portable or mobile computing devices such as smartphones, laptops, tablets, gaming devices or the like, and other electronic devices such as electronic databases, automobiles, bank automated teller machines (ATM) or the like. The embodiment of the present disclosure is not limited thereto.

Figure 2:
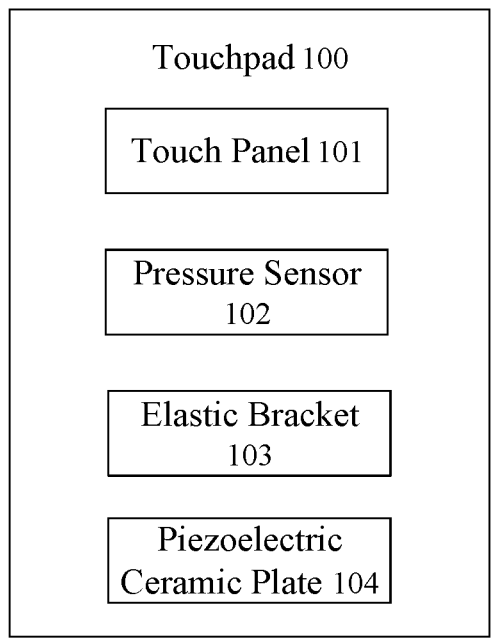
FIG. 2 is a schematic block diagram of a touchpad according to the embodiment of the present disclosure.

FIG. 2 is a schematic structural diagram of a touchpad 100 according to the embodiment of the present disclosure. As shown in FIG. 2, the touchpad 100 includes:

a touch panel 101;

a pressure sensor 102 configured to convert a deformation of the pressure sensor into a first electrical signal for pressure detection when the touch panel is under pressure;

an elastic bracket 103 configured to support the pressure sensor, and drive the pressure sensor to elastically deform therewith when the touch panel is under pressure;

a piezoelectric ceramic assembly including a piezoelectric ceramic plate 104 configured to provide a vibration feedback to a user when the first electrical signal is greater than a first threshold, where the piezoelectric ceramic assembly is fixed below the touch panel in a suspended manner and spaced from the elastic bracket.

Specifically, in this embodiment, when being subjected to a pressure, the touch panel transmits the pressure to the elastic bracket below, the bracket is bent to drive the pressure sensor supported by the bracket to elastically deform therewith, and then the pressure sensor converts a detected deformation into an electrical signal for pressure detection. When it is detected that the electrical signal converted by the pressure sensor is greater than a first threshold value, the piezoelectric ceramic plate feeds back a vibration to the user by driving the touch panel to vibrate therewith. The vibration feedback may enable the user to judge whether his press operation is effective, thereby minimizing repetitive gestures.

In the embodiment of the present disclosure, the piezoelectric ceramic assembly is spaced from the elastic bracket, which means that the piezoelectric ceramic assembly is kept out of contact with the elastic bracket during a process from non-deformation to deformation of the elastic bracket. The piezoelectric ceramic assembly is fixed below the touch panel in a suspended manner, which means that the piezoelectric ceramic assembly has no support at its bottom, and there is a gap between the piezoelectric ceramic assembly and the touch panel.

It should be noted that the first threshold is a specified threshold, which may be obtained empirically. The first threshold may be a critical value for a pressure degree at which the user can feel the vibration. The first threshold is greater than 0.

As an example, critical values for various pressure degrees may be stored in the electronic device, and the user may select one of them according to his habits. For example, the electronic device stores a critical value for a light pressing, a critical value for a medium pressing, and a critical value for a heavy pressing, and the user may select one of them according to the pressure degree he gets used to.

Therefore, the touchpad of the embodiment of the present disclosure adopts a piezoelectric ceramic plate as a vibration source, and thus has a lighter and thinner structure and generates a vibration to be clearly and sufficiently felt. In addition, the piezoelectric ceramic plate is employed to provide the vibration feedback, meanwhile the pressure sensor is employed to detect the pressure, thereby improving accuracy of pressure detection, and making it possible to detect a continuous pressure. In addition, the piezoelectric ceramic assembly is fixed below the touch panel in a suspended manner and thus spaced from the elastic bracket for supporting the pressure sensor, so that the vibration of the piezoelectric ceramic plate shall not affect the pressure detection of the pressure sensor, the vibration of the piezoelectric ceramic plate is strongly felt, and thus a good user experience is offered. Therefore, a same vibration feeling is offered to the user with less piezoelectric ceramic plates and thus less cost.

Figure 3:
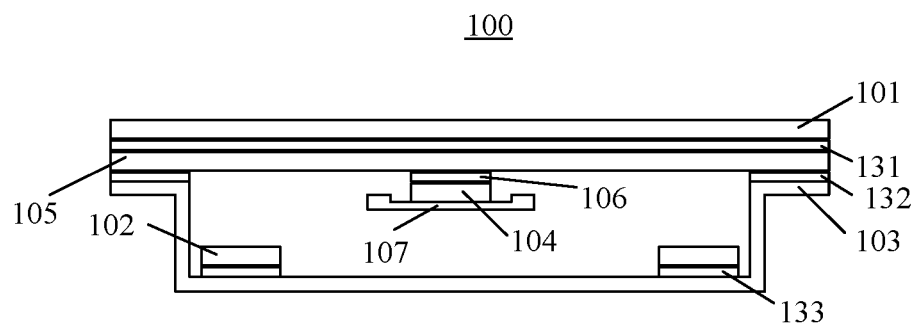
FIG. 3 is a schematic diagram of an example of a stacked structure of the touchpad according to the embodiment of the present disclosure.

FIG. 3 is a schematic diagram of an example of a stacked structure of the touchpad 100 according to the embodiment of the present disclosure.

As shown in FIG. 3, in an example of the embodiment of the present disclosure, the touchpad 100 includes:
- a circuit board 105 fixed to a lower surface of the touch panel, and configured to process the first electrical signal and control the piezoelectric ceramic plate to provide the vibration feedback to the user when the first electrical signal is greater than the first threshold.

As shown in FIG. 3, the circuit board 105 may be bonded to the lower surface of the touch panel 101. For example, the circuit board 105 is fixed to the lower surface of the touch panel 101 by an adhesive 131. The circuit board 105 may be equipped with electronic components and circuits, and configured to process electrical signals generated based on pressure, vibration, etc., and implement a system setting function.

As an example, the circuit board 105 may include a pressure detection chip, a piezoelectric ceramic drive chip, a peripheral circuit, a connector, etc.

Specifically, the pressure detection chip may judge whether the first electrical signal detected by the pressure sensor reaches the first threshold value, and send a vibration instruction to the piezoelectric ceramic drive chip if the first threshold value is reached. After receiving the vibration instruction, the piezoelectric ceramic drive chip drives the piezoelectric ceramic plate to vibrate according to a pre-set mode, and the piezoelectric ceramic plate drives the touch panel to vibrate therewith to feed back the vibration to the user.

As an example of the embodiment of the present disclosure, the touchpad 100 further includes:
- a capacitance detection array configured to convert a capacitance change caused by finger touch into a second electrical signal for touch detection.

As an example, the circuit board 105 may also be configured to process the second electrical signal.

That is, the circuit board 105 may further include a touch detection chip. The touch detection chip and the pressure detection chip may be collectively referred to as a control chip.

As an example, a surface of the circuit board 105 may have a capacitance detection array formed by copper sheets. When the touch panel is touched by a finger, the capacitance detection array converts a capacitance change into an electrical signal and transmits the electrical signal to the touch detection chip.

In the embodiment of the present disclosure, the touch detection chip and the pressure detection chip are combined into one, that is, a single chip is employed to perform both pressure detection and touch detection, which reduces power consumption, simplifies circuit structure, saves cost for the system, and provides a faster system response.

Figure 4:
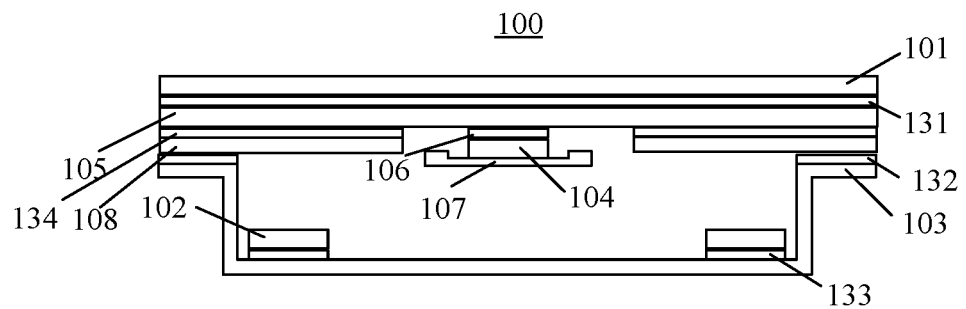
FIG. 4 is a schematic diagram of another example of the stacked structure of the touchpad according to the embodiment of the present disclosure.

FIG. 4 is a schematic diagram of another example of the stacked structure of the touchpad 100 according to the embodiment of the present disclosure. Compared with FIG. 3, the touchpad 100 in FIG. 4 further includes:
- a reinforcing plate 108 fixed to both ends of a lower surface of the circuit board 105, and configured to increase rigidity of the touch panel 101.

Specifically, the reinforcing plate 108 and the circuit board 105 may be bonded by an adhesive 134, and the elastic bracket 103 is bonded to a lower surface of the reinforcing plate 108 by an adhesive 132.

As an example, the reinforcing plate may be an aluminum plate or a steel plate.

The reinforcing plate is configured to increase the rigidity of the touch panel 101, thereby reducing the deformation and collapse of the touch panel caused when being pressed by the user.

As shown in FIGS. 3 and 4, the elastic bracket 103 is fixed below the touch panel 101.

Specifically, as shown in FIG. 3, the elastic bracket 103 is fixed to the lower surface of the circuit board 105. As shown in FIG. 4, the elastic bracket 103 is fixed to the lower surface of the reinforcing plate 108.

As an example, the elastic bracket 103 defines a first groove. A top portion of each of two side walls of the first groove is fixed below the touch panel 101, and the pressure sensor 102 is fixed to a bottom wall of the first groove.

In an example, the top portion of each side wall extends outward to form a step. An upper surface of the step is fixed below the touch panel 101. The pressure sensor 102 is fixed to the bottom wall of the first groove. For example, the upper surface of the step is fixed to the lower surface of the circuit board 105, or the upper surface of the step is fixed to the lower surface of the reinforcing plate 108.

Specifically, the upper surface of the step may be fixedly connected to the lower surface of the circuit board 105 or the reinforcing plate 108 by the adhesive 132. The pressure sensor 102 may be fixedly connected to the bottom wall of the first groove of the elastic bracket by the adhesive 133.

In another example, the stacked structure below the touch panel 101 defines another groove in which the top portions of the two side walls of the first groove are fixed. For example, the lower surface of the reinforcing plate 108 defines another groove in which the top portions of the two side walls are fixed.

By fixing the elastic bracket in the groove defined by the stacked structure below the touch panel, it is advantageous to reduce a thickness of the touch panel.

In another example, the two side walls of the elastic bracket may also be beveled.

It should be appreciated that the specific shape of the elastic bracket is not limited in this embodiment of the present disclosure, as long as the pressure sensor can be supported and deformed together with the elastic bracket when the touch panel is under pressure.

As an example of the embodiment of the present disclosure, one or more elastic brackets 103 may be provided. One or more pressure sensor 102 may be disposed at the bottom wall of one elastic bracket 103. When a plurality of elastic brackets 103 are provided, the plurality of elastic brackets 103 may be independent form each other, or may be connected as a whole and fixed to edge regions of four sides of the circuit board 105.

The pressure sensor 102 is fitly attached to the elastic bracket 103. When the elastic bracket 103 is bent and deformed, the pressure sensor 102 is deformed together with the elastic bracket 103.

As an example, the touchpad 100 includes a plurality of pressure sensors 102, projections of the plurality of pressure sensors 102 on the touch panel 101 may be located at a position of at least one corner of the touch panel 101 and/or a center of at least one side of the touch panel 101.

With the plurality of pressure sensors, the pressure can be dispersed thereon, thereby increasing structural stability of the touchpad.

Figure 5:
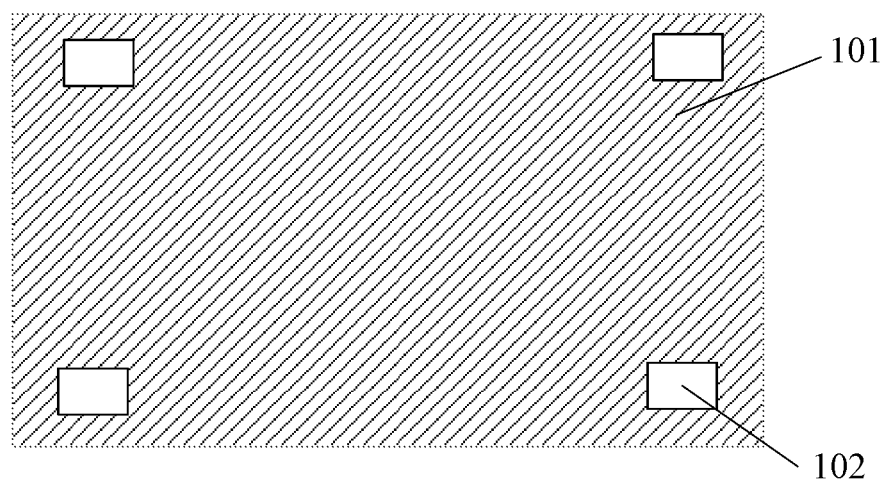
FIGS. 5 to 8 are schematic diagrams illustrating examples of pressure sensors distribution in the touchpad according to the embodiment of the present disclosure.

In an example, as shown in FIG. 5, the plurality of pressure sensors are four pressure sensors 102, and projections of the four pressure sensors 102 on the touch panel 101 are located at four corners of the touch panel 101, respectively.

Figure 6:
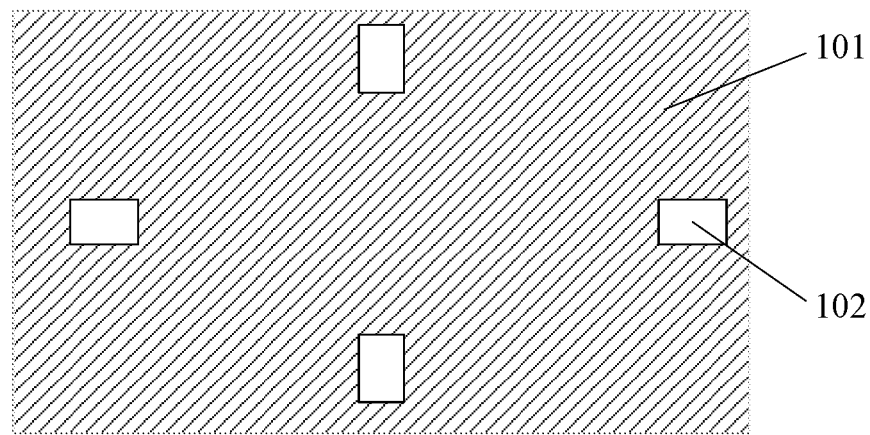

In another example, as shown in FIG. 6, the plurality of pressure sensors are four pressure sensors 102, and projections of the four pressure sensors 102 on the touch panel 101 are located at centers of four sides of the touch panel 101, respectively.

Figure 7:
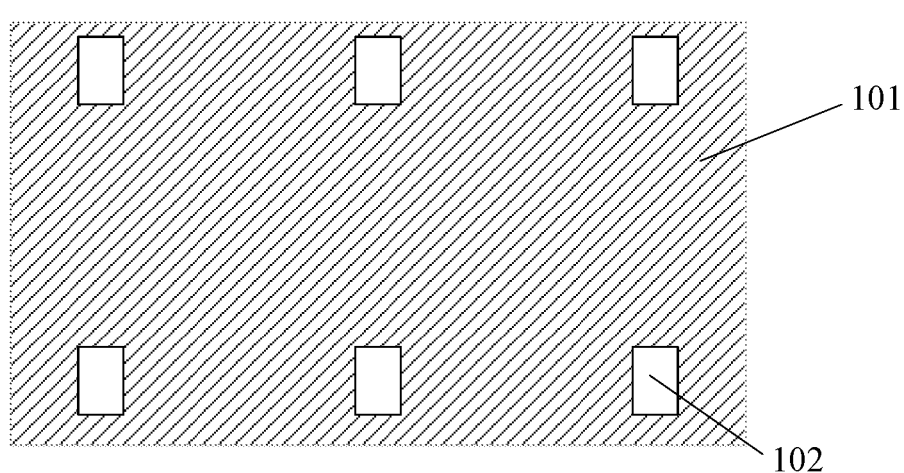

In a further example, as shown in FIG. 7, the plurality of pressure sensors are six pressure sensors 102, and projections of the six pressure sensors 102 on the touch panel 101 are located at four corners of the touch panel 101 and at centers of two long sides of the touch panel 101, respectively.

Figure 8:
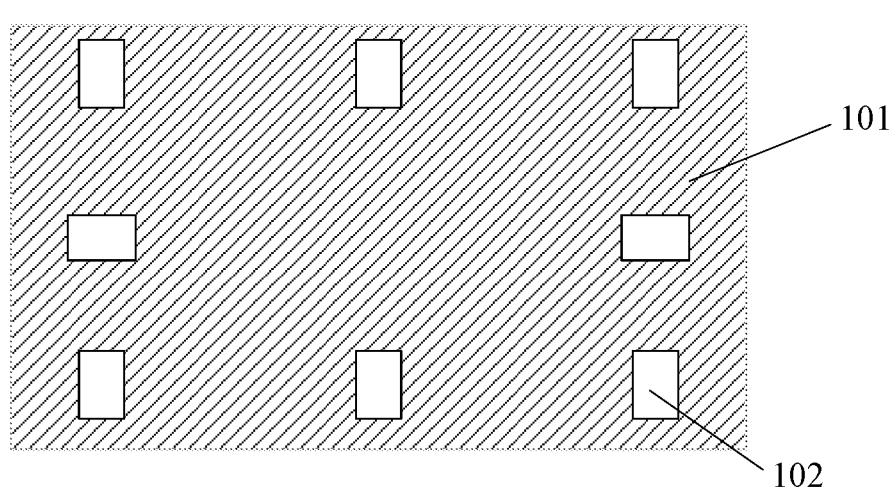

In another further embodiments, as shown in FIG. 8, the plurality of pressure sensors are eight pressure sensors 102, and projections of the eight pressure sensors 102 on the touch panel 101 are located at four corners of the touch panel 101 and at centers of four sides of the touch panel 101, respectively.

The uniformity of pressure detection can be improved by distributing the plurality of pressure sensors at the four corners and/or the centers of the four sides of the touch panel.

As an example, the touch panel 101 may be used for being touched and pressed by the user, and may further server as decoration. The touch panel 101 may be made from glass or Mylar.

As an example, the pressure sensor 102 may be a pressure sensor of piezoresistive type.

As an example, the elastic bracket 103 may be a steel sheet or an aluminum sheet.

As further shown in FIGS. 3 and 4, the touchpad 100 further includes:

a fixing structure 106 by which the piezoelectric ceramic assembly below the touch panel 101 is suspended.

Specifically, the piezoelectric ceramic assembly is fixed to the lower surface of the circuit board 105 by the fixing structure 106. For example, the fixing structure 106 may be a glue, a double-sided adhesive tape, a solder, a screw or a buckle. That is, the piezoelectric ceramic assembly may be fixed to the lower surface of the circuit board 105 by gluing, adhering, welding, screwing, snapping, or the like. The welding may be soldering or laser spot welding.

As an example, as shown in FIG. 4, the reinforcing plate 108 needs to spare an accommodating space for the piezoelectric ceramic assembly. That is, the reinforcing plate 108 is provided with a window at a mounting position of the piezoelectric ceramic assembly.

As further shown in FIGS. 3 and 4, in an example of the present disclosure, the piezoelectric ceramic assembly further includes:

a weighting block 107 fixed to a bottom of the piezoelectric ceramic plate 104, and configured to strengthen the vibration of the piezoelectric ceramic plate 104.

Figure 9:
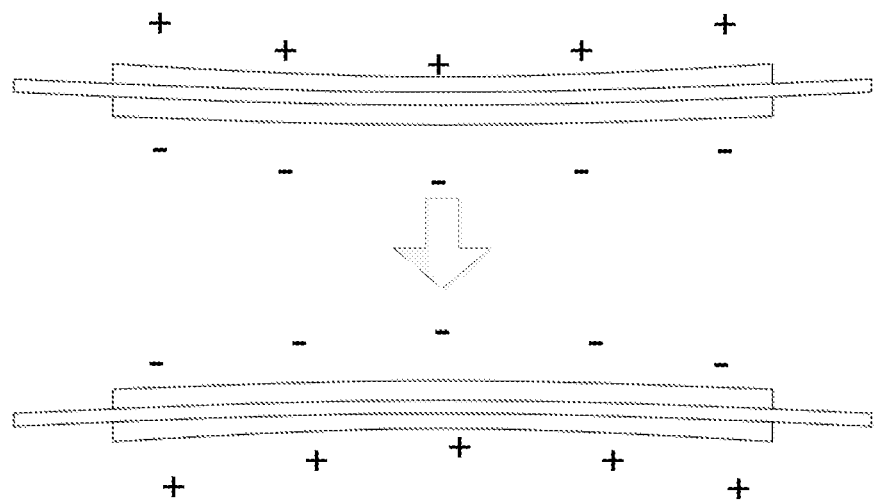
FIG. 9 is a schematic diagram of an example of vibration feedback of the piezoelectric ceramic plate according to the embodiment of the present disclosure.

Specifically, as shown in FIG. 9, the piezoelectric ceramic drive chip on the circuit board 105 generates an alternating voltage. Under an inverse piezoelectric effect, a metal substrate of the piezoelectric ceramic plate 104 is bent into an arcuate shape, a force in a direction opposite to the bending direction is generated at both ends and is equal to a reacting force caused by the deformation. The weighting block with an appropriate weight increases the counter acting forces between the metal substrate and the circuit board 105, thereby strengthening the vibration of the touch panel 101. Alternatively, the weighting block 107 may not be required according to actual requirements.

As an example, the weighting block 107 may be mounted at or near a center of gravity of the piezoelectric ceramic plate 104, may be fixed by a glue or a double-sided adhesive tape. The weighting block 107 may be a copper block, a lead block, a steel block, or the like having a relatively large density.

In the embodiment of the present disclosure, since the weighting block is fixed at the center of gravity of the piezoelectric ceramic plate, the piezoelectric ceramic plate is subjected to a force evenly distributed. On the one hand, the pressure applied on one end of the piezoelectric ceramic plate is not larger than that on the other end, which prevents the fixing structure from easily falling off, and on the other hand, the vibration feedback effect is better.

In addition, the weighting block with a large density is selected, which has a small volume and a good weighting effect.

In an example, the weighting block 107 may be a cuboid block defining a second groove in which the piezoelectric ceramic plate 104 is disposed.

A thickness of the touch panel can be further reduced by disposing the piezoelectric ceramic plate in the groove of the weighting block.

As an example, the weighting block 107 may also be of other shapes, for example, the weighting block 107 may be shaped in accordance with the shape of the piezoelectric ceramic plate 104. The second groove may be of other shapes, such as trapezoid, which is not limited in this embodiment of the present disclosure.

As an example of the embodiment of the present disclosure, a weighting block of an appropriate weight is selected to enhance the vibration feedback effect. For example, a length and a width of the piezoelectric ceramic plate 104 may be 50 mm and 6 mm, respectively, and a weight of the weighting block 107 may be 2.5 g.

Each of the length and the width of the piezoelectric ceramic plate 104 has a deviation, for example, of ±1 mm. That is, the length of the piezoelectric ceramic plate may be in a range from 49 mm to 51 mm, and the width of the piezoelectric ceramic plate may be in a range from 5 mm to 7 mm.

The weight of the weighting block 107 has a deviation, for example, of ±0.1 g. That is, the weight of the weighting block may be in a range from 2.4 g to 2.6 g.

The embodiment of the present disclosure will be described with an example in which the weight of the weight block 107 is about 2.5 g.

Figure 10:
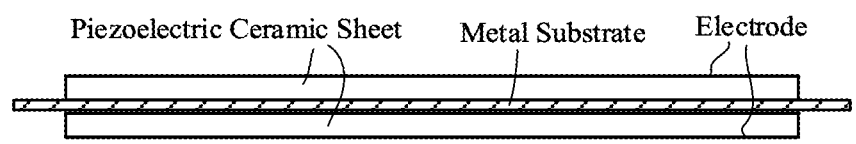
FIG. 10 is a schematic structural diagram of an example of the piezoelectric ceramic plate according to the embodiment of the present disclosure.

As shown in FIG. 10, the piezoelectric ceramic plate generally includes a piezoelectric ceramic sheet, a metal substrate, and an electrode. Specifically, a electrode, a piezoelectric ceramic sheet, a metal substrate, a piezoelectric ceramic sheet, and a electrode are sequentially stacked from top to bottom. The electrodes and the piezoelectric ceramic sheets are flush with each at both ends, and both ends of the metal substrate protrudes out of the piezoelectric ceramic sheets.

Figure 11:
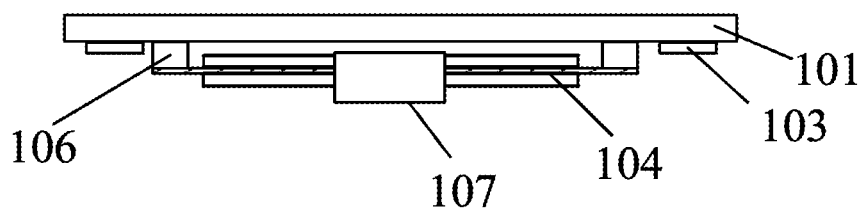
FIG. 11 is a schematic diagram of an example of installation of the piezoelectric ceramic plate according to the embodiment of the present disclosure.

As an example, both protruding ends of the metal substrate of the piezoelectric ceramic plate 104 may be fixed to the lower surface of the circuit board 105 by the fixing structure 106, so that the piezoelectric ceramic plate 104 is suspended below the touch panel 101. The installation may be as shown in FIG. 11.

As another example, a groove may be defined at a middle of an upper surface of the piezoelectric ceramic plate 104 to expose the metal substrate. The fixing structure 106 is disposed in the groove and fixed to the lower surface of the circuit board 105 so that the piezoelectric ceramic plate 104 is suspended below the touch panel 101.

As an example, a thickness of the fixing structure 106 may be about 0.5 mm. A gap between the fixing structure 106 and the piezoelectric ceramic sheet is at least greater than or equal to 0.1 mm, for example, in a range from 0.1 mm to 0.2 mm. The gap space the fixing structure from the piezoelectric ceramic sheet, so that the fixing structure does not affect the vibration of the piezoelectric ceramic plate. In addition, the fixing structure has an appropriate thickness, which, on the one hand, is thick enough to keep the piezoelectric ceramic plate out of contact with the touch panel during vibrating, and on the other hand, is thin enough to not increase the thickness of the touch panel.

The embodiment of the present disclosure further provides a single-end fixation scheme without a weighting block.

Figure 12:
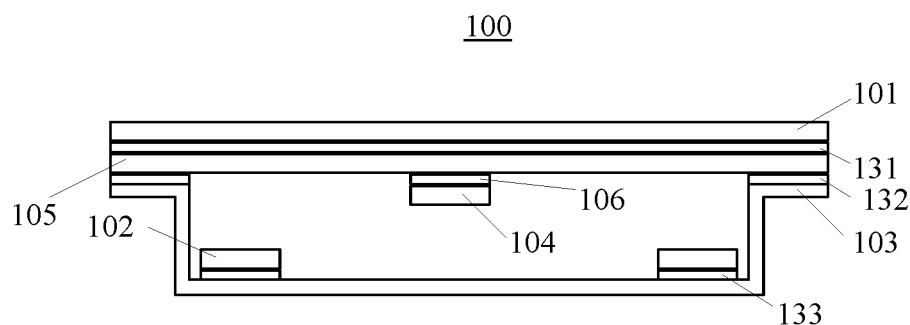
FIG. 12 is a schematic diagram of a further example of the stacked structure of the touchpad according to the embodiment of the present disclosure.

FIG. 12 is a schematic diagram of a further example of the stacked structure of the touchpad according to the embodiment of the present disclosure. The structure is the same as that shown in FIG. 3, except that the touch panel 100 does not include a weighting block.

Figure 13:
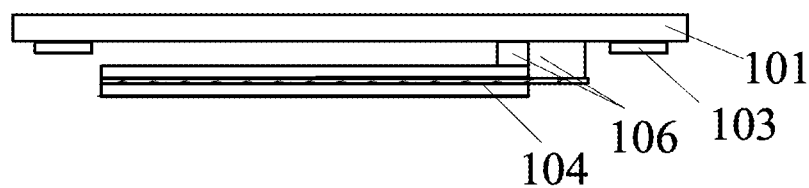
FIG. 13 is a schematic diagram of another example of installation of the piezoelectric ceramic plate according to the embodiment of the present disclosure.

Specifically, one end of the metal substrate protrudes from the piezoelectric ceramic sheet and the electrode. The protruding end of the metal substrate of the piezoelectric ceramic plate 104 and the piezoelectric ceramic sheet may be fixed to the lower surface of the circuit board 105 by a fixing structure 106 so that the piezoelectric ceramic plate 104 is suspended below the touch panel 101. The fixing structure 106 is disposed as close as possible to a trailing end of the metal substrate. A length of the fixing structure 106 is not more than half a total length of the piezoelectric ceramic plate 104, and a thickness of the fixing structure is in a range from 0.4 mm to 0.6 mm. The installation may be as shown in FIG. 13. Since the piezoelectric ceramic assembly is fixed in a suspended manner below the touch panel at a single end of the piezoelectric ceramic assembly, according to the lever principle, when the piezoelectric ceramic assembly receives the vibration instruction, one end of the piezoelectric ceramic assembly vibrates up and down according to the driving signal output by the piezoelectric ceramic drive chip. Since the rigidity of the piezoelectric ceramic sheet is greater than the rigidity of the metal substrate, the vibration of the end of the piezoelectric ceramic assembly is transmitted to an other end of the piezoelectric ceramic assembly, so that the touch panel is driven to vibrate, the vibration of the piezoelectric ceramic plate is stronger and the user experience is better. Therefore, a same vibration feeling is offered to the user with less piezoelectric ceramic plates and thus less cost. Since both the protruding end of the metal substrate and the piezoelectric ceramic sheet are fixed to the lower surface of the circuit board 105 by a fixing structure 106, a service life of the piezoelectric ceramic assembly is longer, and the piezoelectric ceramic sheet is prevented from being separated from the metal substrate due to long-time vibration.

Figure 14:
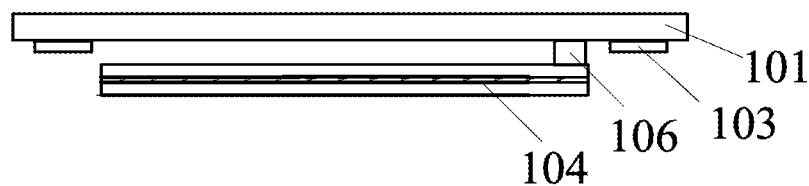
FIG. 14 is a schematic diagram of a further example of installation of the piezoelectric ceramic plate according to the embodiment of the present disclosure.

As another example, the metal substrate may not protrude from the piezoelectric ceramic sheet and the electrode. The piezoelectric ceramic sheet of the piezoelectric ceramic plate 104 may be fixed to the lower surface of the circuit board 105 by a fixing structure 106 so that the piezoelectric ceramic plate 104 is suspended below the touch panel 101. The fixing structure 106 is disposed as close as possible to a trailing end of the piezoelectric ceramic sheet. The length of the fixing structure 106 is not more than half a total length of the piezoelectric ceramic plate 104, and the thickness of the fixing structure is in a range from 0.4 mm to 0.6 mm. The installation may be as shown in FIG. 14. In FIG. 11, both protruding ends of the metal substrate are fixed to the lower surface of the circuit board 105 by the fixing structure 106, the driving signal output from the piezoelectric ceramic drive chip is applied to the electrodes at both ends, so that the bending deformation of the metal substrate cause a vibration up and down, thereby driving the touch panel to vibrate. In the embodiment of the present disclosure, according to the lever principle, since the rigidity of the piezoelectric ceramic sheet is greater than the rigidity of the metal substrate, the vibration of one end of the piezoelectric ceramic assembly is transmitted to the other end of the piezoelectric ceramic assembly, thereby driving the touch panel to vibrate.

As an example, the piezoelectric ceramic plate 104 may also be fixed to the lower surface of the circuit board 105 by two fixing structures 106 disposed as close as possible. One of the two fixing structures is disposed as close as possible to a trailing end of the piezoelectric ceramic plate 104. The piezoelectric ceramic assembly is fixed in a suspended manner at one end below the touch panel by two fixing structures, and the touch panel is driven to vibrate according to the lever principle, which increases the structural reliability and the vibration strength of the touchpad.

Figure 15:
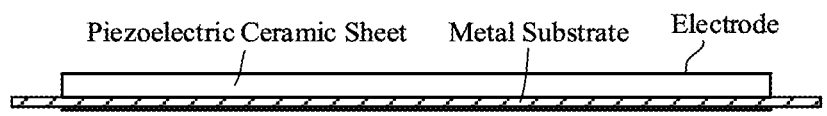
FIGS. 15 to 17 are schematic structural diagrams of other examples of the piezoelectric ceramic plate according to the embodiment of the present disclosure.
Figure 16:
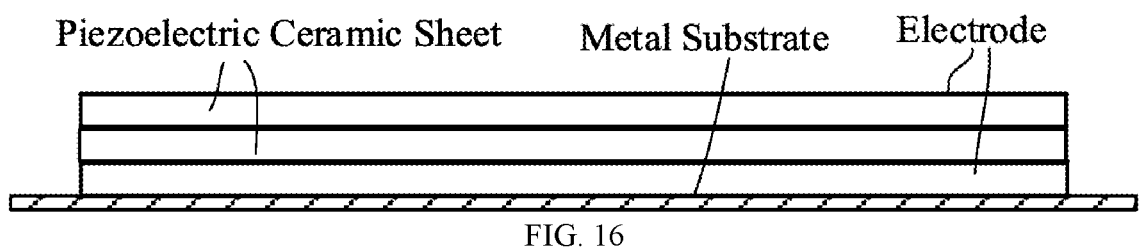
Figure 17:
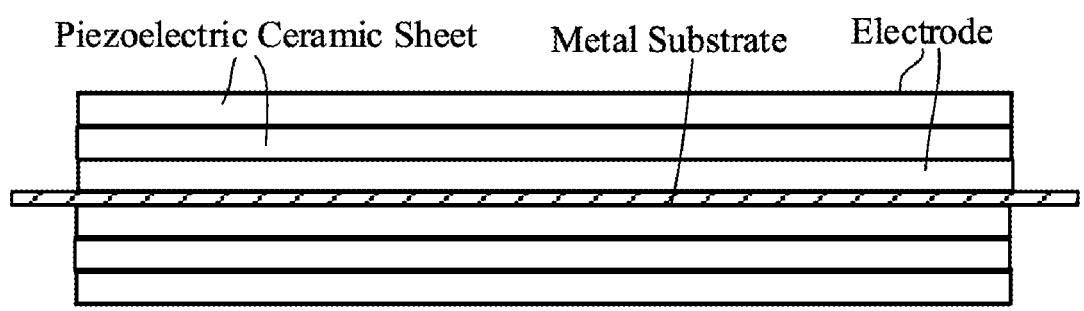

As an example, the piezoelectric ceramic plate may be a single-sided single-layer plate as shown in FIG. 15, which, for example, may include an electrode, a piezoelectric ceramic sheet and a metal substrate stacked sequentially stacked sequentially. Alternatively, the piezoelectric ceramic plate may be a single-layer double-sided plate as shown in FIG. 10, which, for example, may include an electrode, a piezoelectric ceramic sheet, a metal substrate, a piezoelectric ceramic sheet and a further electrode stacked sequentially from top to bottom. Alternatively, the piezoelectric ceramic plate may be a multi-layer single-sided plate as shown in FIG. 16, which, for example, may include an electrode, a piezoelectric ceramic sheet, an electrode, a piezoelectric ceramic sheet, an electrode, a piezoelectric ceramic sheet and a metal substrate stacked sequentially from top to bottom. Alternatively, the piezoelectric ceramic plate may be a strip-shaped multi-layer multi-sided plate as shown in FIG. 17, which, for example, may include an electrode, a piezoelectric ceramic sheet, an electrode, a piezoelectric ceramic sheet, an electrode, an electrode, a piezoelectric ceramic sheet, a metal substrate, a piezoelectric ceramic sheet, an electrode, a piezoelectric ceramic sheet, an electrode, a piezoelectric ceramic sheet and an electrode stacked sequentially from top to bottom. Preferably, the single-layer double-sided piezoelectric ceramic plate may achieve better vibration performance while reducing cost.

In the embodiment of the present disclosure, the piezoelectric ceramic plate can be selected by comprehensively considering factors such as vibration strength, cost, and drive voltage, so as to improve the performance of the touchpad.

As an example, the piezoelectric ceramic plate may be selected to have a length of 50 mm and a width of 6 mm. As an example, the piezoelectric ceramic plate is selected to have a length-width ratio of 50:6 as long as it can be applicable to a touch panel of an appropriate size and/or can meet a requirement for a certain vibration strength. For example, a piezoelectric ceramic plate having a length of 50 mm and a width of 6 mm is applicable to a touch panel having a length of 150 mm and a width of 90 mm. For example, the vibration feedback may be enhanced by adjusting the drive voltage without altering the size of the piezoelectric ceramic plate.

As an example of the embodiment of the present disclosure, the touchpad 100 may include one piezoelectric ceramic plate 104. As an example, the piezoelectric ceramic plate 104 may be disposed at a center of the touch panel 101.

Figure 18:
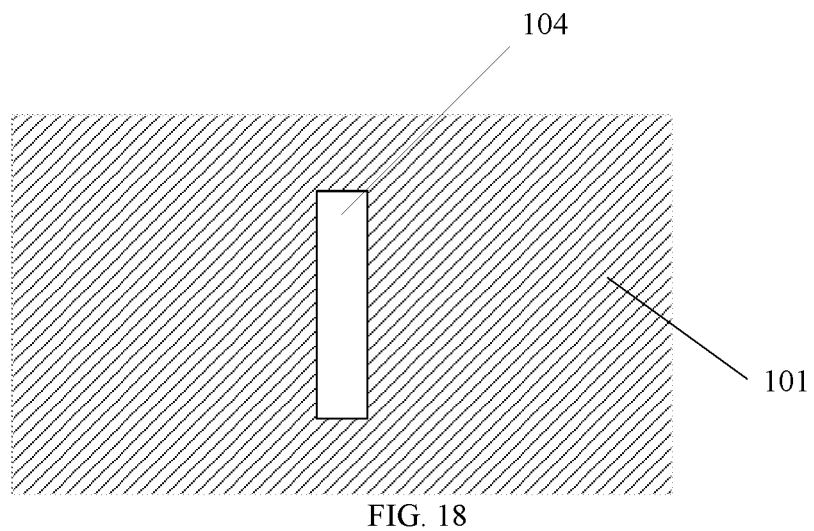
FIGS. 18 to 19 are schematic diagrams of examples of installation direction of the piezoelectric ceramic plate according to the embodiment of the present disclosure.

For example, as shown in FIG. 18, the piezoelectric ceramic plate 104 is mounted in a direction parallel to a long side or a short side of the touch panel 101.

Figure 19:
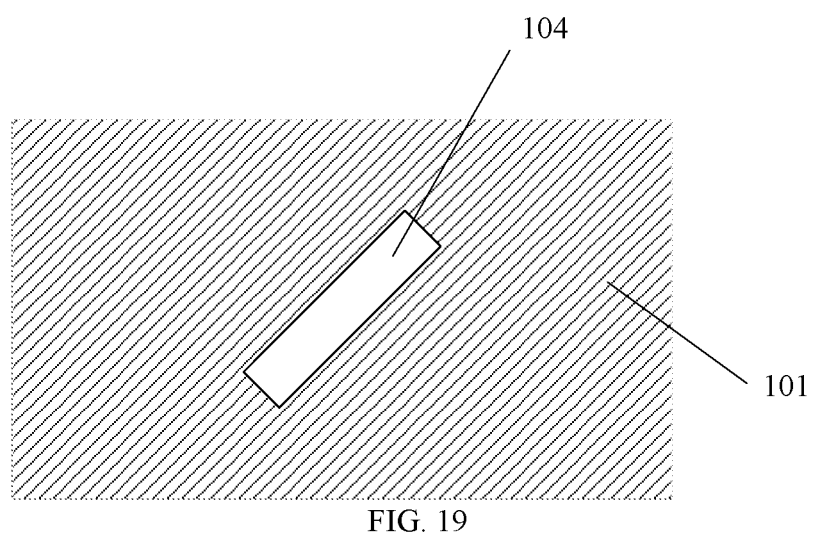

For another example, as shown in FIG. 19, the piezoelectric ceramic plate 104 is mounted in a direction inclined to the long side or the short side of the touch panel 101.

As an example, the touchpad 100 of the embodiment of the present disclosure may include a plurality of piezoelectric ceramic plates 104, which may vibrate individually or together, thereby increasing consistency of vibration strength at different positions of the touch panel.

Figure 20:
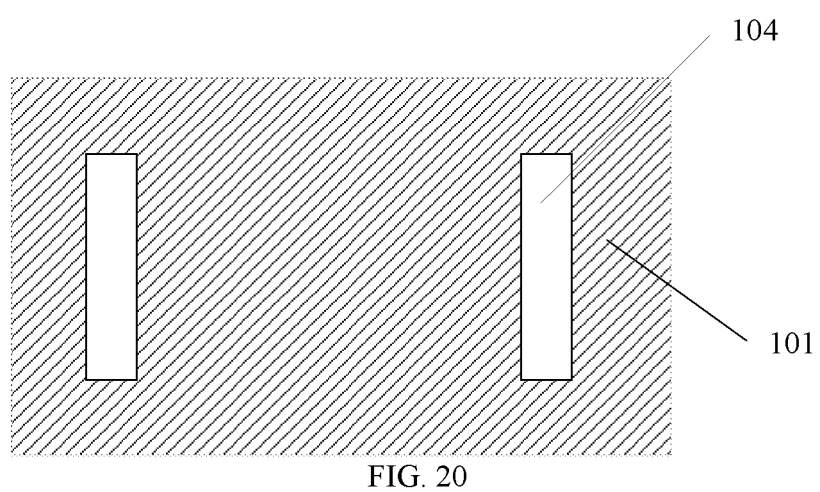
FIGS. 20 to 23 are schematic diagrams of examples of distribution of the piezoelectric ceramic plates according to the embodiment of the present disclosure.
Figure 21:
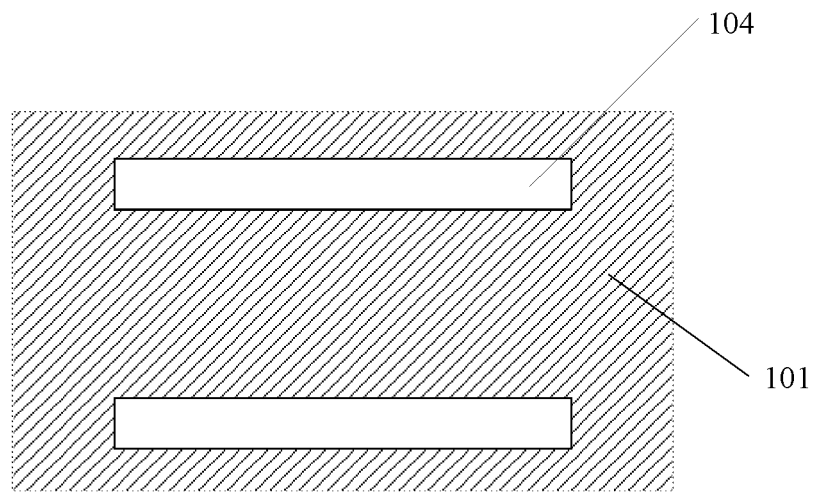
Figure 22:
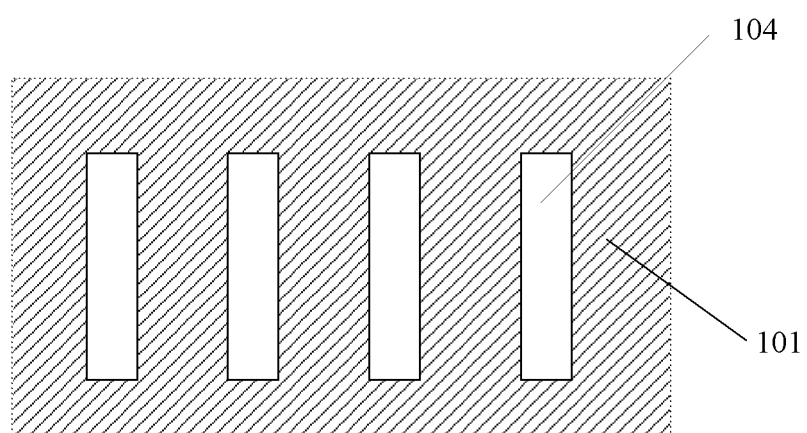

As an example, as shown in FIGS. 20-22, the plurality of piezoelectric ceramic plates are disposed parallelly side by side. In FIG. 20, two piezoelectric ceramic plates 104 are disposed side by side parallel to a short side of the touch panel 101. In FIG. 21, two piezoelectric ceramic plates 104 are disposed side by side parallel to a long side of the touch panel 101. In FIG. 22, four piezoelectric ceramic plates 104 are disposed side by side parallel to the short side of the touch panel 101.

Figure 23:
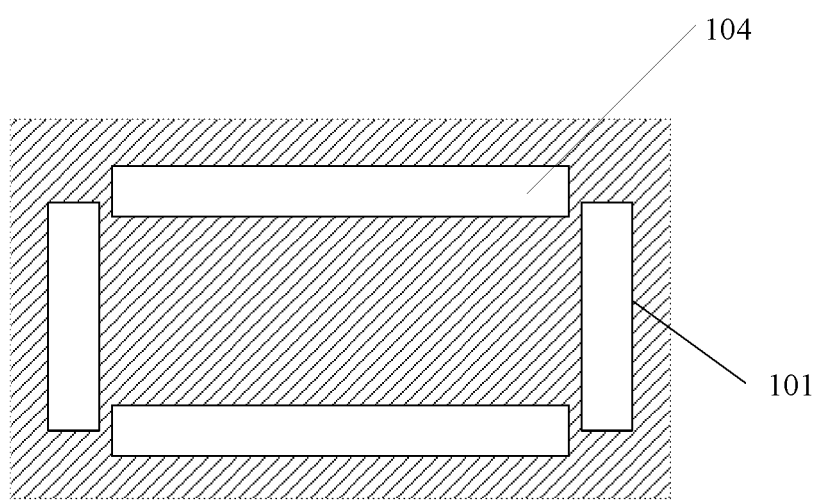

As an example, some of the plurality of piezoelectric ceramic plates 104 are disposed side by side parallel to a long side of the touch panel 101, and other some of the plurality of piezoelectric ceramic plates 104 are disposed side by side parallel to a short side of the touch panel 101. As shown in FIG. 23, the plurality of piezoelectric ceramic plates includes four piezoelectric ceramic plates 104, which are disposed at edge positions of the four sides of the touch panel 101, respectively.

In the embodiment of the present disclosure, the aforementioned sizes are provided by way of example, and are not intended to limit the embodiment of the present disclosure.

As an example of the embodiment of the present disclosure, the adhesive 131 may be a double-sided adhesive tape. The adhesive 132 may be a flexible glue or a glue pad. The adhesive 133 may be an instantaneous adhesive, an epoxy adhesive or an adhesive film. The adhesive 134 may be a double-sided adhesive tape or a glue.

Figure 24:
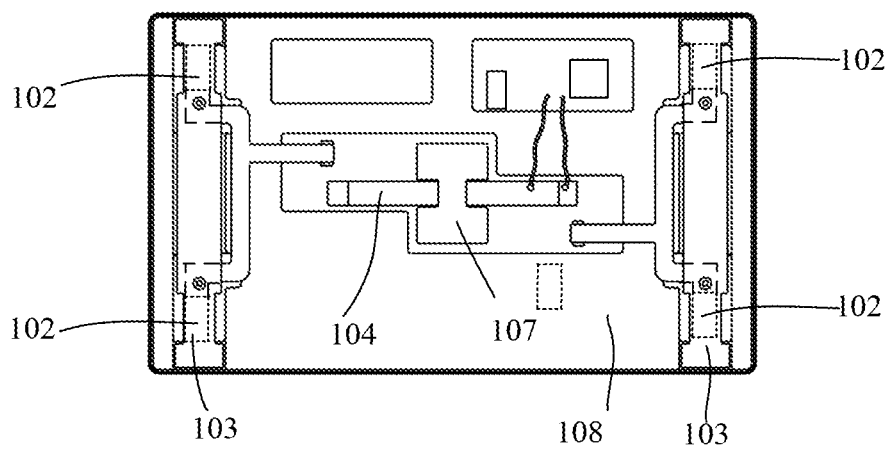
FIGS. 24 and 25 are bottom views of examples of the touchpad according to the embodiment of the present disclosure.
Figure 25:
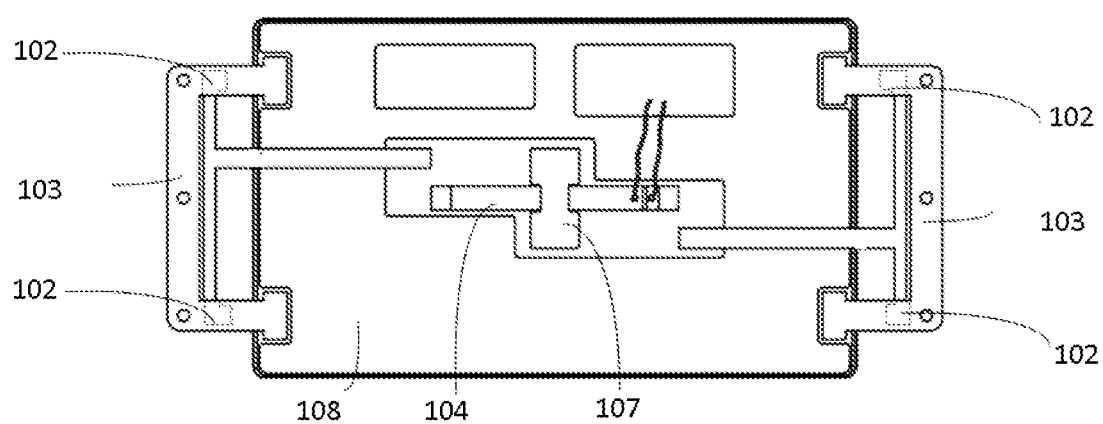

FIG. 24 is a bottom view of an example of the touchpad according to the embodiment of the present disclosure, and FIG. 25 is a bottom view of another example of the touchpad according to the embodiment of the present disclosure.

FIG. 24 is a bottom view of the touchpad 100 shown in FIG. 3. Compared with FIG. 24, the pressure sensors 102 is fixed beside the touch panel 101 by the elastic bracket 103 in FIG. 25, and the projection of the pressure sensor 102 on a plane where the touch panel 101 is located is outside a region of the touch panel 101.

In an example, as shown in FIG. 25, the elastic bracket 103 may be of a U-shaped sheet structure including two short shafts fixed at an edge region below the touch panel 101 and one long shaft. The pressure sensor 102 is disposed on the short shafts. The long shaft extending along a side of the touch panel 101 such that the pressure sensor 102 is located on the plane where the touch panel 101 is located.

As an example, the elastic bracket 103 may also be of a semicircular sheet structure.

Herein, the shape of the elastic bracket 103 is not limited in the embodiment of the present disclosure.

Further, the pressure sensor 102 is disposed on the short shafts of the elastic bracket and at a position near the junctions of the short shafts and the long shaft.

Compared with FIG. 25, in another example, there is an included angle between the elastic bracket 103 and the touch panel 101. In other words, the projection of the pressure sensor 102 on a plane where the touch panel 101 is located is outside a region of the touch panel 101, while the pressure sensor 102 is not on the same plane where the touch panel 101 is located.

In the embodiment of the present disclosure, the pressure sensor is fixed beside of the touchpad, so that the thickness of the touch panel can be reduced, for example, the thickness of the touch panel may be 3 mm.

As an example of the embodiment of the present disclosure, the touchpad may include a plurality of elastic brackets 103. For example, two elastic brackets 103 are provided and disposed opposite to each other, each of which is provided with two pressure sensors 102.

The pressure sensor 102 is fitly attached to the elastic bracket 103, and when the touch panel 101 is subjected to the pressure, the elastic bracket 103 is deformed together with the pressure sensor 102, so that the pressure sensor 102 can convert the detected deformation into an electrical signal.

Figure 26:
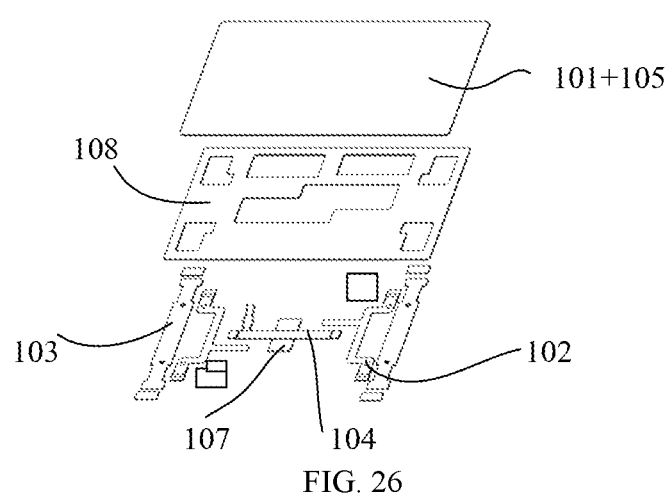
FIG. 26 is a schematic exploded view of an example of the touchpad according to the embodiment of the present disclosure.

FIG. 26 is a structural exploded view of an example of the touchpad according to the embodiment of the present disclosure. The components shown in FIG. 26 are consistent with those described above, and are not described herein for conciseness.

Figure 27:
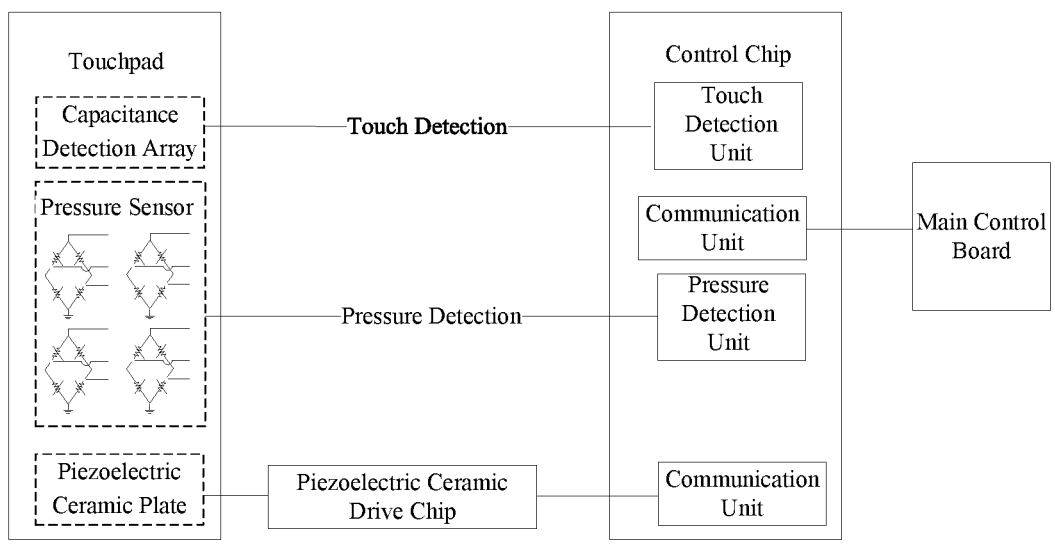
FIG. 27 is a schematic diagram of an example of interaction of internal structure of the touchpad according to the embodiment of the present disclosure.

FIG. 27 is a schematic diagram of an example of interaction of internal structure of the touchpad according to the embodiment of the present disclosure. As shown in FIG. 27, a capacitance detection array below a touch panel converts a detected capacitance change into an electrical signal and sends the electrical signal to a touch detection unit in a control chip, and a pressure sensor below the touch panel converts a detected deformation signal into an electrical signal and sends the electrical signal to a pressure detection unit in the control chip, for example, a 4-channel piezoresistive detection unit. The control chip may communicate with a main control board in an electronic device through a communication unit. When the pressure detection unit determines that the pressure signal is greater than a first threshold, the control chip may communicate with a piezoelectric ceramic drive chip through the communication unit, and then the piezoelectric ceramic drive chip drives the piezoelectric ceramic plate to vibrate with the touch panel.

Optionally, the embodiments of the present disclosure further provide an electronic device including a touchpad according to various examples of the aforementioned embodiments.

It should be appreciated that references in the specification to "an embodiment", "an example", etc., indicate that the embodiment/example described may include a particular feature, structure, or characteristic, but every embodiment/example may not necessarily include the particular feature, structure, or characteristic. Moreover, such phrases are not necessarily referring to the same embodiment/example. Further, when a particular feature, structure, or characteristic is described in connection with an embodiment/example, it is submitted that it is within the knowledge of those skilled in the art to effect such feature, structure, or characteristic in connection with other embodiments/examples whether or not explicitly described.

Those skill in the art will appreciate that the units and circuits of the examples described in the embodiments disclosed herein can be implemented in electronic hardware, or a combination of computer software and electronic hardware. Whether these functions are implemented in hardware or software depends on the specific application and design constraints of the technical solution. Those skilled in the art may implement the described functions using different methods for each particular application, but such implementation should not be considered beyond the scope of the present disclosure.

In some of the examples of the embodiments provided herein, it should be understood that the disclosed circuits, branches thereof, and units may be implemented in other ways. For example, the branches described above are merely exemplary. For example, the division of the unit is merely a logical function division, and there may be another division manner in practical implementation. For example, a plurality of units or components may be combined or integrated into one branch, or some features may be ignored or not executed.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

Although the disclosure is illustrated and described herein with reference to specific embodiments, the disclosure is not intended to be limited to the details shown. Rather, various modifications may be made in the details within the scope and range of equivalents of the claims and without departing from the disclosure. Accordingly, the protection scope of the present disclosure shall prevail over the protection scope of the claims.

What is claimed is:

1. A touchpad comprising:
a touch panel;
a plurality of pressure sensors fixed to an elastic bracket and configured to detect pressure applied on the touch panel;
a piezoelectric ceramic assembly comprising a piezoelectric ceramic plate configured to provide vibration feedback to a user, wherein the piezoelectric ceramic assembly is fixed below the touch panel in a suspended manner and spaced from the elastic bracket, such that the piezoelectric ceramic assembly is not supported underneath and a gap exists between the piezoelectric ceramic assembly and the touch panel; and
wherein the elastic bracket defines a first groove, a top portion of each of two side walls of the first groove is fixed below the touch panel, and the plurality of pressure sensors are fixed to a bottom wall of the first groove.

2. The touchpad according to claim 1, further comprising:
a fixing structure configured to fix the piezoelectric ceramic assembly below the touch panel in a suspended manner.

3. The touchpad according to claim 2, wherein the piezoelectric ceramic plate comprises a piezoelectric ceramic sheet, a metal substrate and an electrode; and
both ends of the metal substrate protrude from the piezoelectric ceramic and the electrode, and fixed below the touch panel by the fixing structure.

4. The touchpad according to claim 2, wherein the piezoelectric ceramic plate comprises a piezoelectric ceramic sheet, a metal substrate and an electrode; and
one end of the piezoelectric ceramic sheet is fixed below the touch panel by the fixing structure.

5. The touchpad according to claim 4, wherein one end of the metal substrate protrudes from the piezoelectric ceramic sheet and the electrode, and one end of the metal substrate and the end of the piezoelectric ceramic sheet are both fixed below the touch panel by the fixing structure.

6. The touchpad according to claim 1, wherein the piezoelectric ceramic assembly further comprises:
a weighting block fixed to a bottom of the piezoelectric ceramic plate and configured to strengthen a vibration of the piezoelectric ceramic plate.

7. The touchpad according to claim 6, wherein the weighting block is a cuboid block defining another groove in which the piezoelectric ceramic plate is disposed.

8. The touchpad according to claim 6, wherein the weighting block is fixed at or near a center of gravity of the piezoelectric ceramic plate.

9. The touchpad according to claim 1, comprising one piezoelectric ceramic plate arranged at a center of the touch panel and mounted in a direction parallel to a long side or a short side of the touch panel.

10. The touchpad according to claim 1, comprising a plurality of piezoelectric ceramic plates, wherein the plurality of piezoelectric ceramic plates disposed parallelly side by side; or wherein some of the plurality of piezoelectric ceramic plates are arranged side by side parallel to a long side of the touch panel, and other some of the plurality of piezoelectric ceramic plates are arranged side by side parallel to a short side of the touch panel.

11. The touchpad according to claim 1, comprising four pressure sensors, wherein projections of the four pressure sensors on the touch panel are located at four corners of the touch panel, respectively; or wherein projections of the four pressure sensors on the touch panel are located at centers of four sides in the touch panel, respectively.

12. The touchpad according to claim 1, wherein the plurality of pressure sensors are fixed beside the touch panel, and projections of the plurality of pressure sensors on a plane where the touch panel is located is outside a region of the touch panel.

13. The touchpad according to claim 12, comprising two elastic brackets disposed opposite to each other, each of which is provided with two pressure sensors.

14. The touch panel according to claim 1, wherein the top portion of each of the two side walls extends outward to form a step, and an upper surface of the step is fixed below the touch panel.

15. The touch panel according to claim 14, wherein a stacked structure below the touch panel defines another groove in which top portions of the two side walls of the first groove are fixed.

16. The touchpad according to claim 1, further comprising a reinforcing plate fixed to both ends of a lower surface of a circuit board and configured to increase rigidity of the touch panel.

17. An electronic device comprising a touchpad, wherein the touchpad comprises:
a touch panel;
a plurality of pressure sensors fixed to an elastic bracket and configured to detect pressure applied on the touch panel;
a piezoelectric ceramic assembly comprising a piezoelectric ceramic plate configured to provide vibration feedback to a user, wherein the piezoelectric ceramic assembly is fixed below the touch panel in a suspended manner and spaced from the elastic bracket, such that the piezoelectric ceramic assembly is not supported underneath and a gap exists between the piezoelectric ceramic assembly and the touch panel; and
wherein the elastic bracket defines a groove, a top portion of each of two side walls of the groove is fixed below the touch panel, and the plurality of pressure sensors are fixed to a bottom wall of the groove.

* * * * *